(12) United States Patent
Amara et al.

(10) Patent No.: US 12,440,787 B2
(45) Date of Patent: Oct. 14, 2025

(54) DISC FILTER HOLDER

(71) Applicant: EMD Millipore Corporation, Burlington, MA (US)

(72) Inventors: John Paul Amara, Bedford, MA (US); James Ormond, Belmont, MA (US); Kevin McDermot, Salem, NH (US)

(73) Assignee: EMD Millipore Corporation, Burlington, MA (US)

( * ) Notice: Subject to any disclaimer, the term of this patent is extended or adjusted under 35 U.S.C. 154(b) by 382 days.

(21) Appl. No.: 18/185,015

(22) Filed: Mar. 16, 2023

(65) Prior Publication Data

US 2023/0330574 A1    Oct. 19, 2023

Related U.S. Application Data

(60) Provisional application No. 63/363,212, filed on Apr. 19, 2022.

(51) Int. Cl.
*B01D 35/30* (2006.01)
*B01D 29/05* (2006.01)

(52) U.S. Cl.
CPC .............. *B01D 35/30* (2013.01); *B01D 29/05* (2013.01); *B01D 2201/4069* (2013.01)

(58) Field of Classification Search
CPC ................... B01D 35/30; B01D 29/05; B01D 2201/4069; B01L 3/5635; B01L 9/00
USPC .......................... 210/455, 222, 541; 269/8, 9
See application file for complete search history.

(56) References Cited

U.S. PATENT DOCUMENTS

2018/0126386 A1*   5/2018  Witko .................... B02C 18/16

* cited by examiner

*Primary Examiner* — Madeline Gonzalez
(74) *Attorney, Agent, or Firm* — EMD Millipore Corporation

(57) ABSTRACT

The present invention is for a magnetized filter holder.

11 Claims, 9 Drawing Sheets

DISC FILTER HOLDER

CROSS-REFERENCE TO RELATED APPLICATION

The present application claims the benefit of priority of U.S. Provisional Application No. 63/363,212, filed Apr. 19, 2022, the entire content of which is incorporated herein by reference.

BACKGROUND

Biopharmaceutical production operations often require downstream filtration steps to effect solid/liquid separations. In this regard, numerous types of filtering devices have been conceived and developed to aid in the downstream processing of biologics ranging from small filters, such as those designed to fit onto a syringe, to large, complex systems that require superstructures to hold and align filter units.

In any event, nearly all filtering devices used in bioprocessing comprise a filter material and a housing to hold the material. The housing maintains both the sterility and the structural integrity of the filter material when used. Furthermore, securing the filter helps to maintain filter integrity by preventing stress on the filter housing and, thus, premature failure of the housing or filter material.

Filtration devices are frequently employed in a variety of applications in the upstream and downstream purification of therapeutic reagents and biopharmaceuticals, such as monoclonal antibodies. These include clarification of the cell culture harvest, sterile filtration, normal and tangential flow filtration, ultrafiltration, diafiltration, and virus filtration. Membrane adsorber devices have also been developed and these are used for the purification of the biopharmaceutical products by chromatographic techniques such as capture chromatography, bind/elute chromatography, and flow-through chromatography. These chromatographic separations may be accomplished by affinity chromatography, cation exchange chromatography or anion exchange chromatography, for example.

At production scale, downstream biopharmaceutical filtration and purification applications may require between 2,000-20,000 L of cell culture to be sequentially clarified by depth filtration, purified by chromatographic separations, concentrated (by ultrafiltration/diafiltration) and filtered to remove adventitious bacteria and viruses (i.e., sterile filtration, virus filtration). However, laboratory scale filters are typically used on a benchtop, sometimes using scale-down versions of the production scale filter devices (i.e., having the same or similar filter characteristics). These scale-down filter devices are frequently in the form of disc-shaped filters. Often, these scale-down versions do not exactly duplicate the filtration performance of the production scale filters. As a result, the production scale filters may be slightly oversized by including a "safety factor" that minimizes the risk of filter plugging at production scale that could result in the loss of a portion of the production batch.

Inaccurate scale-down filtration measurements conducted at the laboratory scale may result in filtration capacity estimates that are too low or too high for a given production process resulting in either premature filter blockage or the use of costly over-sized units. Careful attention needs to be paid to various factors that may influence experimental results in laboratory scale filter media and sizing operations. One option is to orient the scale-down filter device in an orientation that matches the orientation of the larger format of the filter device that is used in production scale filtration operations.

Thus, what is needed are devices that allow for the easy and flexible manipulation of the orientation of the scaled-down (i.e., laboratory scale) filter devices to emulate various large-scale filtration processes to ensure accurate measurement of and correct specification (i.e., sizing) of production scale units.

SUMMARY OF THE INVENTION

The present invention solves this problem in the prior art by providing for a filter holder design for disc-shaped filter devices (disc filter holder) that is useful for laboratory scale filter media screening and sizing operations. The holder is intended to hold the scaled-down filter device in a vertical orientation (or other desired orientation) on a benchtop. In some aspects, the orientation matches the orientation of the larger format of the filter device that is used in production scale filtration operations. In other aspects, the filter holder allows for the realignment of the filter in relation to other parts of the screening apparatus or other filters.

The disc filter holder (also referred to herein as a "holder" or "filter holder") may include two (or more) diametrically magnetized magnets. In a preferred embodiment, the magnets are cylindrical. These magnets are oriented in a manner that allows several of the disc filter holders to assemble into a variety of convenient orientations for the user. The holder provides a more consistent experimental set-up for the laboratory scale filter sizing tests, resulting in more reliable filter capacity measurements for production scale filtration operations.

The improved disc filter holder of the present invention is not limited by size. Although laboratory (i.e., bench scale) units are envisioned, similar larger holders may be used in mid-scale processes or even large-scale processes.

The improved disc filter holder is not limited by shape so long as the filter holder securely holds the filter unit and prevents unwanted reorientation (i.e., unwanted movement or repositioning) of the filter unit and allows for access to any inlets and outlets on the filter unit.

The improved filter holder is not limited by the specifications of the filter used in the filter holder. The filter may be a diafiltration filter, ultrafilter, viral filter, etc. Further, although the filter holder of the present invention is referred to as a "disc filter holder," one of ordinary skill in the art understands that filter holders of other shapes may be utilized depending on the shape of the filters requiring securing and/or orientation.

The present invention is directed toward a filter holder, comprising: a front piece, comprising, i) a front wall having a base, a first side edge and a second side edge, ii) a first front side wall and iii) a second front side wall, said first front side wall connected with the first side edge of the front wall and said second front side wall connected to the second edge of the front wall, both the first front side wall and second front side wall at substantially a right angle to said front wall, wherein said base extends from and is connected to said first front side wall, said second front side wall and said front wall and, further, extends beyond said front wall in a direction opposite of said first front side wall and said second front side wall; a rear piece, comprising, i) a back wall having a base, ii) a first rear side wall and iii) a second rear side wall, the first rear side wall and the second rear side wall being essentially cylindrical and hollow and extending from said back wall at essentially right angles forming a first cylindrical rear side wall and a second cylindrical rear side wall, wherein said base extends from and is connected to said first rear side wall, said second rear side wall and said back wall and, further, extends beyond said back wall in a direction opposite of said first rear side wall and said second rear side wall; the front piece further comprising, at the junction of the base and the first front side wall, a first cylindrical opening; and at the junction of the base and the second front side wall, a second cylindrical opening; said first and said second cylindrical openings being aligned with the first cylindrical rear side wall and the second cylindrical opening being aligned with said second cylindrical rear side wall when the front piece is aligned with the rear piece; a first magnet, sized to fit into said first cylindrical rear side wall and said first front cylindrical opening, and a second magnet size to fit into the second rear side wall and said second cylindrical opening when the front piece is aligned with and connected to the rear piece.

Further, wherein the front piece of the filter holder of the present invention has a top edge and a void area, the void area being approximately equidistant between the first side edge and second side edge and extending from the top edge of the front wall to approximately halfway to the base.

Further still, the filter holder of the present invention has a first front side wall and second front side wall that are curved toward each other as they approach the base.

Yet further still, the filter holder of the present invention has a front piece with a width from 1 inches to 12 inches.

Yet further still, the filter holder of the present invention has a height of the front piece from 1 inches to 8 inches.

Yet further still, the filter holder of the present invention comprises a molded semi-circular trough in the base between said first front and said first rear side walls and said second front and said second rear side walls, sized and positioned to hold a disc-shaped filter device.

Yet further still, in the filter holder of the present invention the first rear side wall is shorter than the first front side wall and the second rear side wall is shorter than the second front side wall.

Yet further still, in the filter holder of the present invention comprises a base that extends past the front wall in a direction opposite the rear wall and is arched.

Yet further still, in the filter holder of the present invention comprises a base that extends past the rear wall in a direction opposite the front wall and is arched Yet further still, in the filter holder of the present invention comprises magnets that are diametrically magnetized magnets.

DETAILED DESCRIPTION OF THE INVENTION

Figure 1:
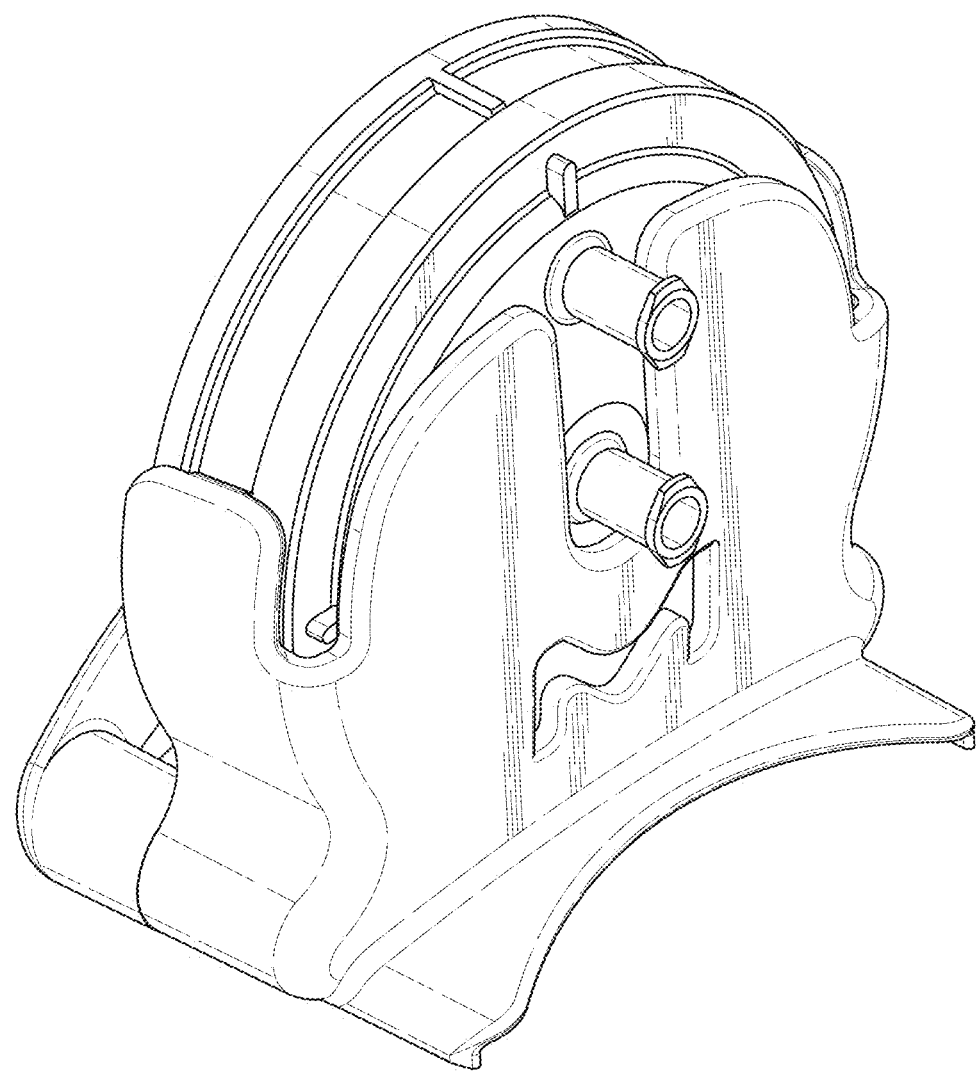
FIG. 1 shows a photograph of the disc filter holder of the present invention (front view).

The disc filter holder of the present invention provides, for example, a consistent experimental set-up for laboratory scale filter sizing tests. The embedded magnets within the filter holder allow for multiple disc filters to be arranged in a range of convenient orientations. For example, arranging the disc filters in a vertical orientation duplicates the filter media orientation in production scale devices and may provide more accurate filter sizing information for production scale filtration operations.

The term "diametrically magnetized magnet(s)" herein refers to magnets that are magnetized across their diameters so that, for example, in a cylindrically shaped magnet the north pole is on one curved side and the south pole is on the opposite curved side. The magnets of the filter holder of the present invention are positioned in the filter holder such that the polarity of the first magnet (e.g., the north pole) is the opposite of the second magnet (e.g., the second pole) so that adjacent filter holders will magnetically "connect" with each other. See, for example, FIGS. 6 & 7. In other embodiments, the magnets may be oriented to repel adjacent filter holders. See, below.

For certain disc filter holder devices of the present invention, the disc filter holder of the present invention contains a recess (i.e., a void area) in the front wall which ensures that the vent port on the disc filter is located in an upwards direction. This orientation facilitates the removal of air from the upstream portion of the filter during the reuse flush operation. Efficient removal of residual air from filter devices may greatly improve the accuracy of the filtration test data and minimizes formation of bubbles in the filtrate. Removal of air from the filter device is important because air bubbles in the filtrate can result in air-locking of downstream sterile filtration devices.

For certain disc filter holder devices of the present invention, the inner surface of the base of the disc filter holder has a curve sized to hold a disc-shaped filter device (i.e., a disc filter) positioned in the disc filter holder.

For certain disc filter holder devices of the present invention, the base of the disc filter holder that extends beyond the front wall and/or back wall of the holder is flat. For others, it is arched or curved upward in the center of the device such that the center of the base is higher than the first edge or second edge of the base of the device (see, for example, FIG. 1).

For certain disc holders of the present invention, the front wall of the front piece has a void extending from the top edge of the front wall towards the base. The void is to allow for inlets and outlets of the filter to project from the disc filter holder device. The void may extend from about 10% to about 90% of the way to the base. In certain disc filter holders of the present invention, the void extends about 40-60% of the way to the base or about 50% of the way to the base. The width of the void is suitable to allow for the inlets and outlets of the filter to project from the disc filter holder device so that, for example, tubing may be attached thereto.

The disc filter holder device of the present invention is not limited by size. In certain embodiments, the disc filter holder is from about 0.5 inches to about 24 inches wide, about 1.0 to about 12 inches wide, about 1.0 to about 8 inches wide, about 1.5 to about 4 inches wide. In certain other embodiments, the disc filter holder is from about 0.5 inches to about 24 inches high, about 1.0 to about 12 inches high, about 1.0 to about 8 inches high, about 1.5 to about 4 inches high. In certain other embodiments, the depth of the disc filter holder is from about 0.25 inches to about 6 inches, about 0.5 inches to about 3 inches.

The disc filter holder of the present invention may be made from any suitable material. In certain disc filter holder devices of the present invention the material is plastic. Although the material need not be autoclavable, in certain disc filter holder devices of the present invention the material and disc filter holder are autoclavable or otherwise sterilizable by means known to one of ordinary skill in the art.

Certain disc filter holder devices of the present invention are made of a front piece and a rear piece, the two pieces being connected (i.e., assembled) to create the disc filter holder device of the present invention. The front piece and rear piece may be connected by, for example, one or more of heat sealing, glue or be snapped together (i.e., the front and rear pieces are designed with tabs and recesses that fit together and hold the pieces together when the pieces are aligned and the requisite force is applied to the pieces). In another certain embodiment, the magnets aid and/or suffice to hold the front piece and rear piece together by being tightly held in their respective recesses, as described below.

In certain embodiments, the magnets are inserted into recesses in or near the base of the disc filter holder prior to assembly. The magnets are aligned so that they are parallel to or essentially parallel to each other along their lengths. In certain disc filter holders of the present invention, the magnets (and their respective recesses) are cylindrical. The magnets of the disc filter holders of the present invention permit the reversible linking of and orientation with other disc filter holders of the present invention (see, e.g., FIGS. 7-9), other magnetized items and surfaces or ferrous-containing items and surfaces.

The magnets may be prevented from rotating (which would adversely affect the magnet's orientation in the disc filter holder device) after insertion into the respective recess with glue and/or by being press fit into the recesses. The term "press fit" herein refers to pressing the magnets into a hole slightly smaller than the magnet such that the magnet will be held tight and motionless. In some certain examples, the recess may have one or more ridges molded into the recess and projecting into the recess to provide the tightness required to hold the magnets tight and motionless. In some certain embodiments, glue may be used alone or in combination with the other methods used to keep the magnets motionless.

The present invention will now be described in view of the figures. One of skill in the art will understand that the figures show only an exemplification of the disc filter holder device of the present invention and that variations thereof are within the ability of one of skill in the art and within the scope of the present invention.

Figure 2:
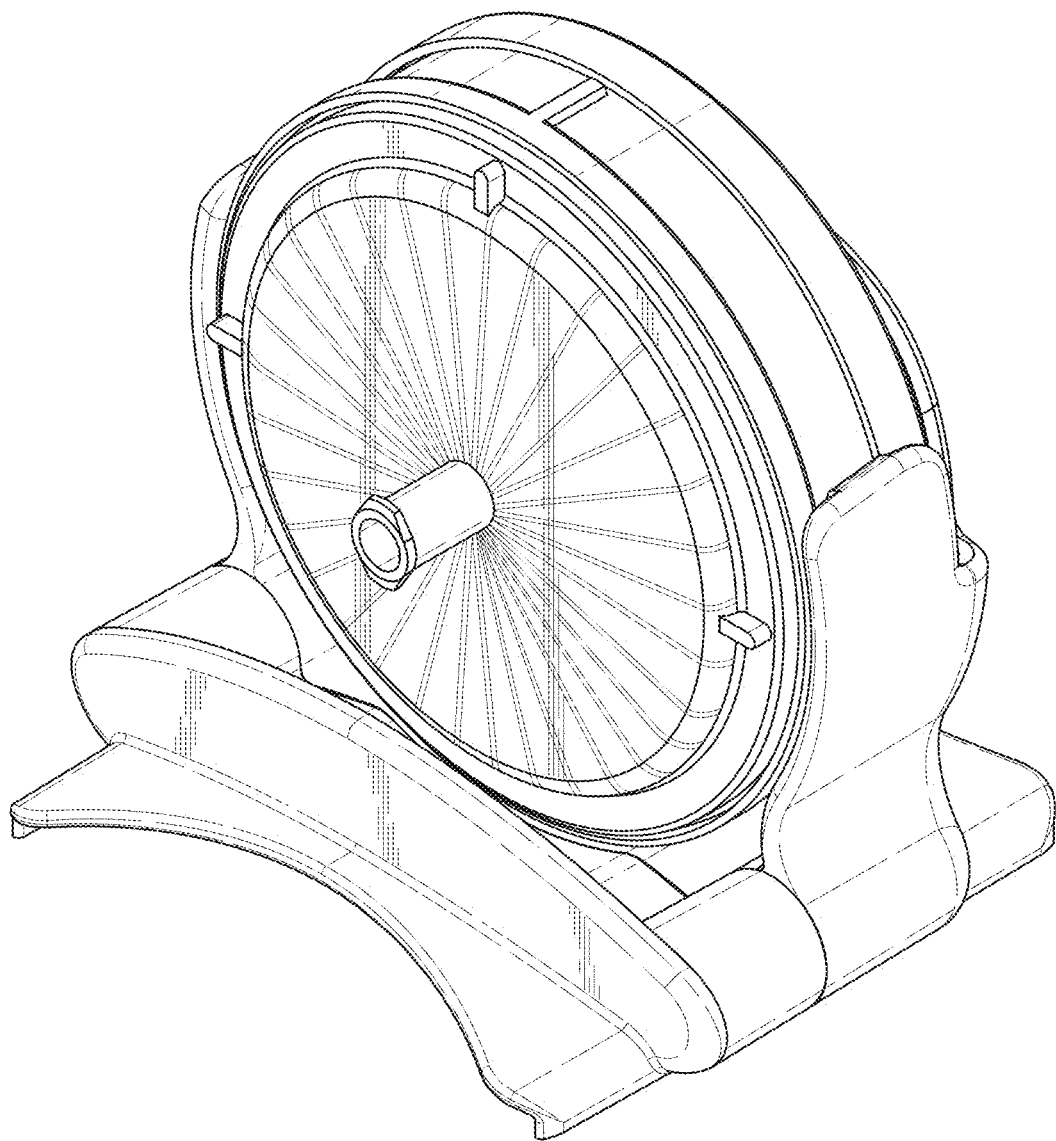
FIG. 2 shows a photograph of the disc filter holder of the present invention (reverse view).

FIGS. 1 and 2 show photographs of a front three-quarter view and a rear three-quarter view, respectively, of an embodiment of the filter holder of the present invention with a filter in place.

Figure 3:
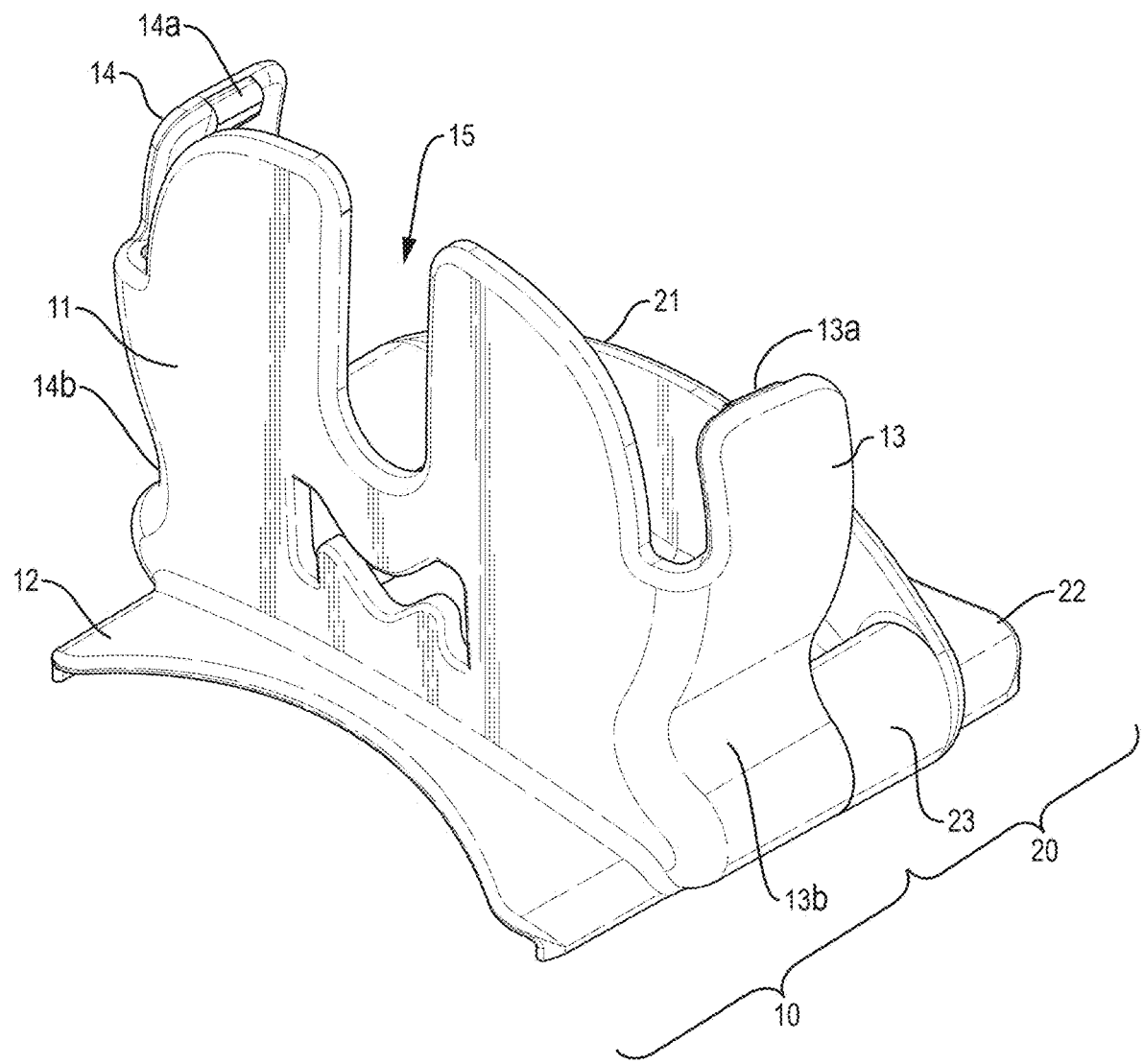
FIG. 3 shows an illustration of the disc filter holder of the present invention (front view).

FIG. 3 shows a representation of the disc filter holder of the present invention in a front three-quarter view. The front piece 10 and rear piece 20 are produced separately but are shown in this figure assembled into the disc filter holder of the present invention. The front piece has a base 12, a front wall 11, a first front side wall 13, the first side wall having a nub 13a to assist in aligning and securing the filter in the holder, and a concave curve 13b at the base; a second side wall 14, the second front side wall having a nub 14a to assist in aligning and securing the filter in the holder, and a concave curve 14b at the base. Further, the front piece has a void area 15 on the front wall for, e.g., the passage of inlet and outlet connectors on the disc filter and associated tubing. The rear piece has a base 22, a rear wall 21, and a first rear side wall 23 and a second side wall (not visible in this view).

Figure 4:
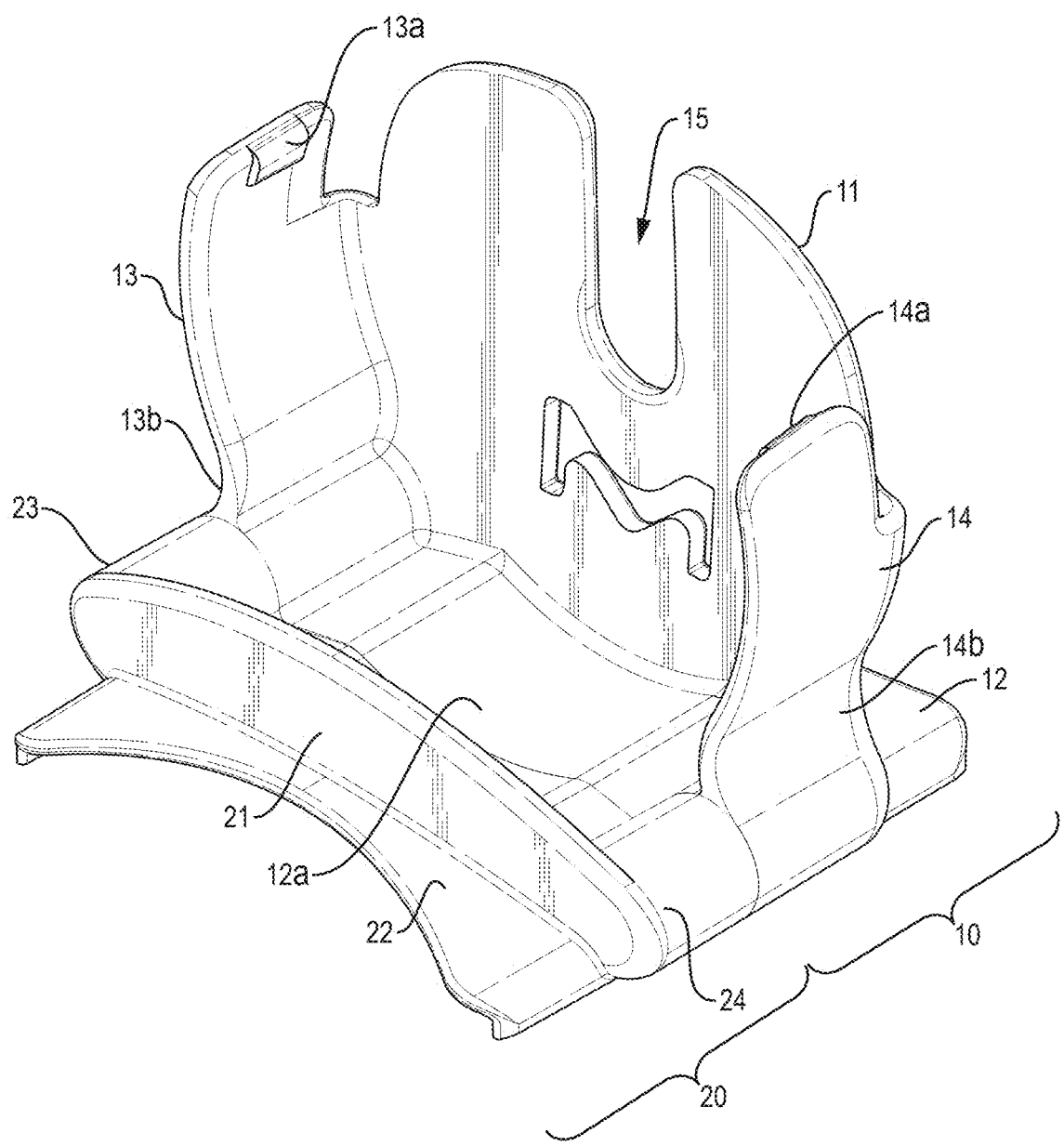
FIG. 4 shows an illustration of the disc filter holder of the present invention (rear view).

FIG. 4 shows a representation of the disc filter holder of the present invention in a rear three-quarter view. The front piece 10 and rear piece 20 are produced separately but are shown in this figure assembled into the disc filter holder of the present invention. The front piece has a base 12, the base having a concave recess 12a in the area behind the front wall, a front wall 11, a first side wall 13, the first front side wall having a nub 13a to assist in aligning and securing the filter in the holder, and a concave curve 13b at the base; a second front side wall 14, the second side wall having a nub 14a to assist in aligning and securing the filter in the holder, and a concave curve 14b at the base; as well as a void area 15 on the front wall for, e.g., passage of inlet and outlet connectors on the disc filter and associated tubing. The rear piece has a base 22, a rear wall 21, and a first rear side wall 23 and a second rear side wall 24.

Figure 5:
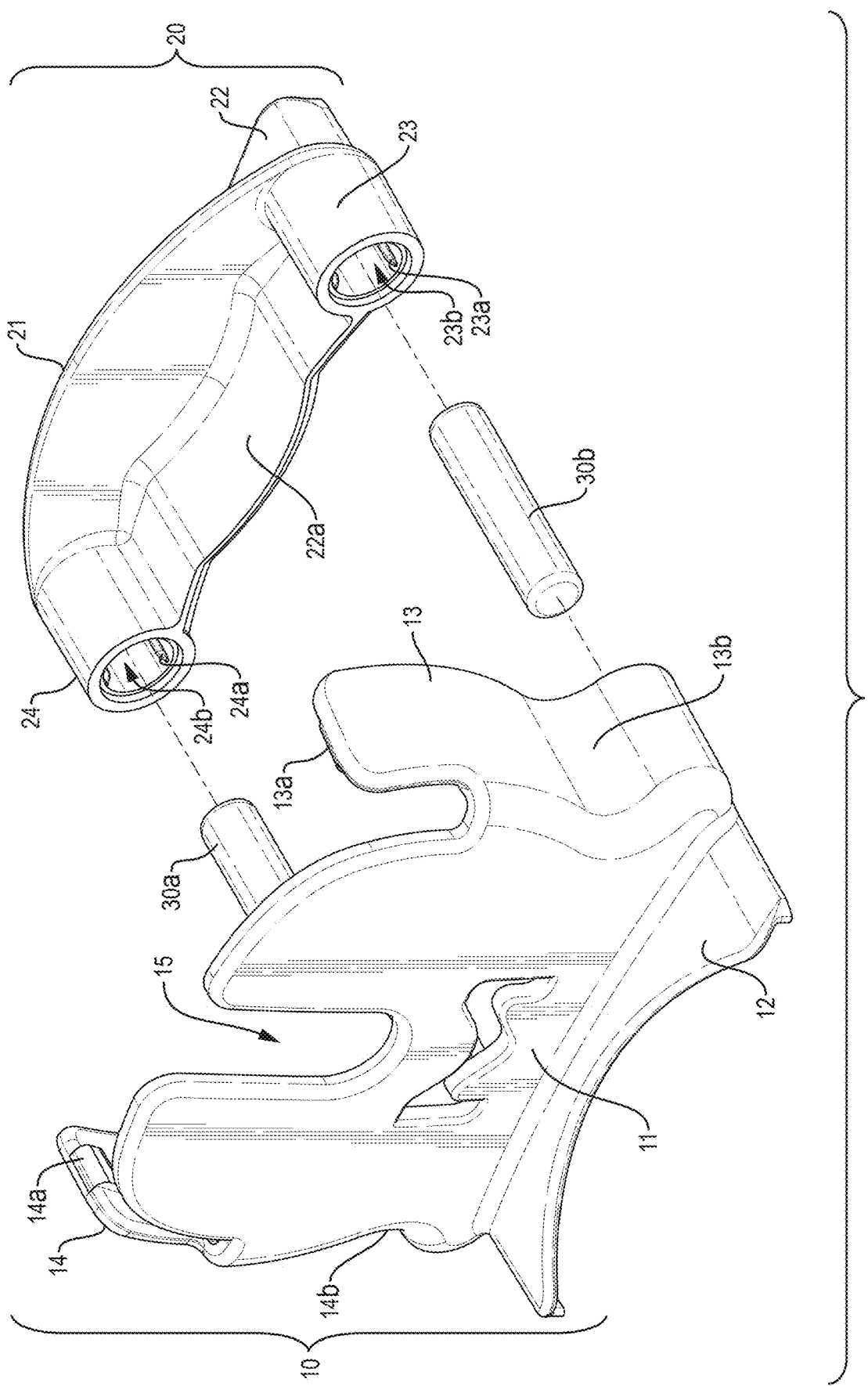
FIG. 5 shows an assembly drawing showing the two diametrically magnetized magnets oriented and embedded within the disc filter holder of the present invention.

FIG. 5 shows an exploded view of the disc filter holder of the present invention. Shown in this view, in addition to the elements repeated from the previous figures, are the recesses 24a and 24b into which the magnets 30a and 30b are inserted prior to assembly of the front piece with the rear piece. Also shown are tabs or ridges 23a and 23b that serve to hold the magnets in the recess and keep the magnets from rotating in the recesses. In addition to the tabs or ridges, or as an alternative means for holding the magnets, glue may be used. It is noted here that similar recess, tabs and/or ridges are located on the front piece and align with the recesses on the rear piece such that the magnets extend from the front piece and into the rear piece.

Figure 6:
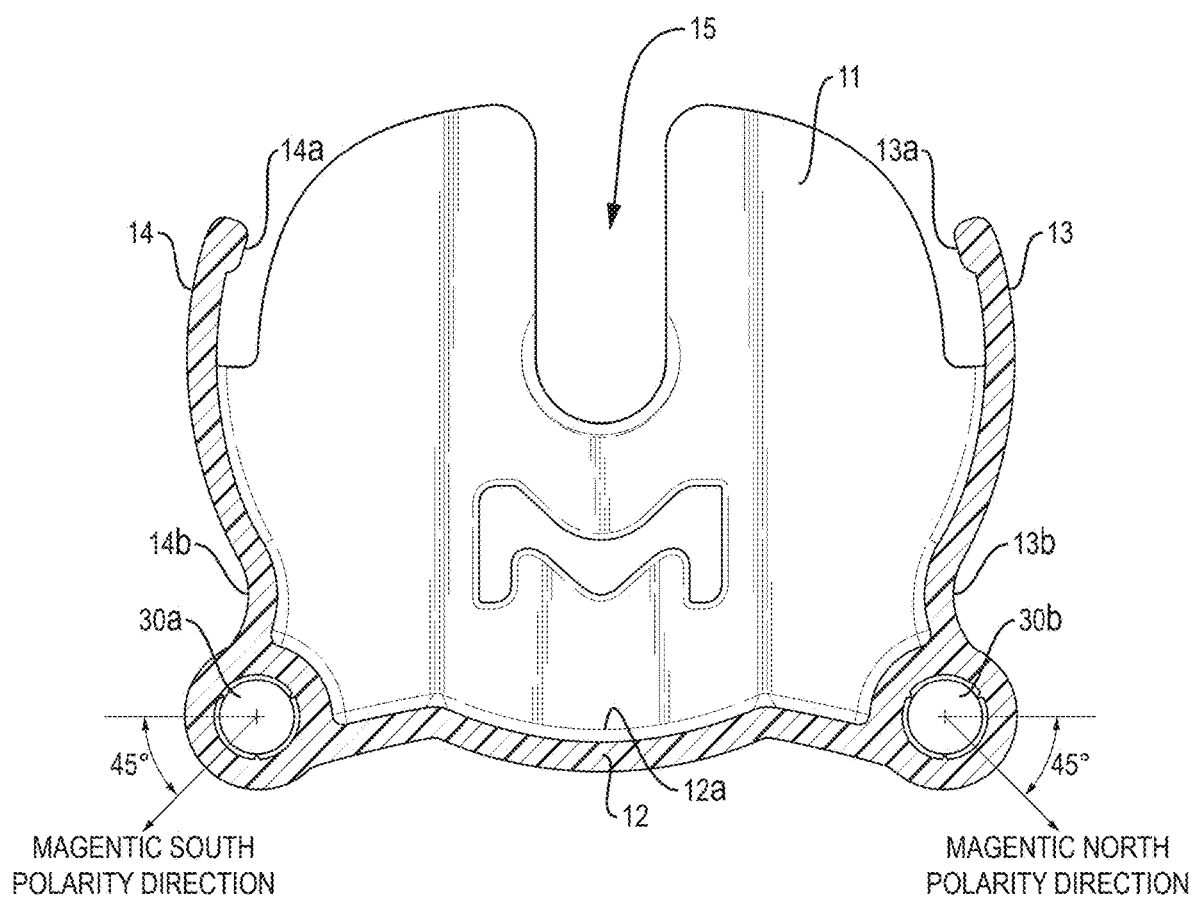
FIG. 6 shows an illustration showing the magnet orientation of the embedded diametrically magnetized magnets (for example, K&J Magnetics Inc., Pipersville, PA. Product No. D4X0DIA-N52, or equivalent) within the disc filter holder of the present invention. In the illustration, the sides and base are cut-away to indicate the location of the magnets.
Figure 7:
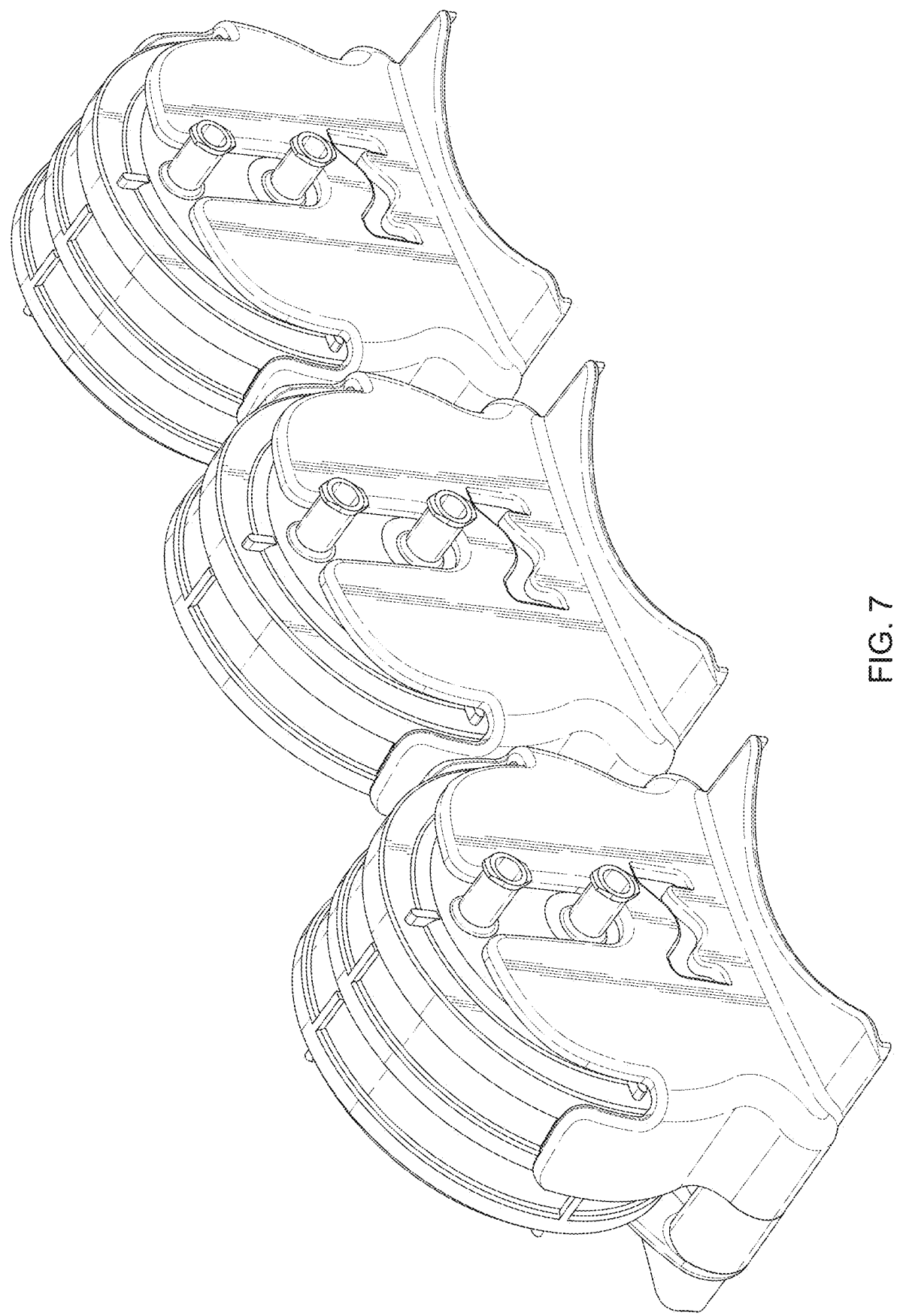
FIG. 7 shows a photograph of three depth filter devices arranged in a vertical orientation on a tabletop by means of three magnetic disc filter holders. It is noted that the specially designed recess on the magnetic disc filter holder allows the filter vent port to be located in an upwards direction. This position facilitates removal of air from the devices during the pre-use flush operation.
Figure 8:
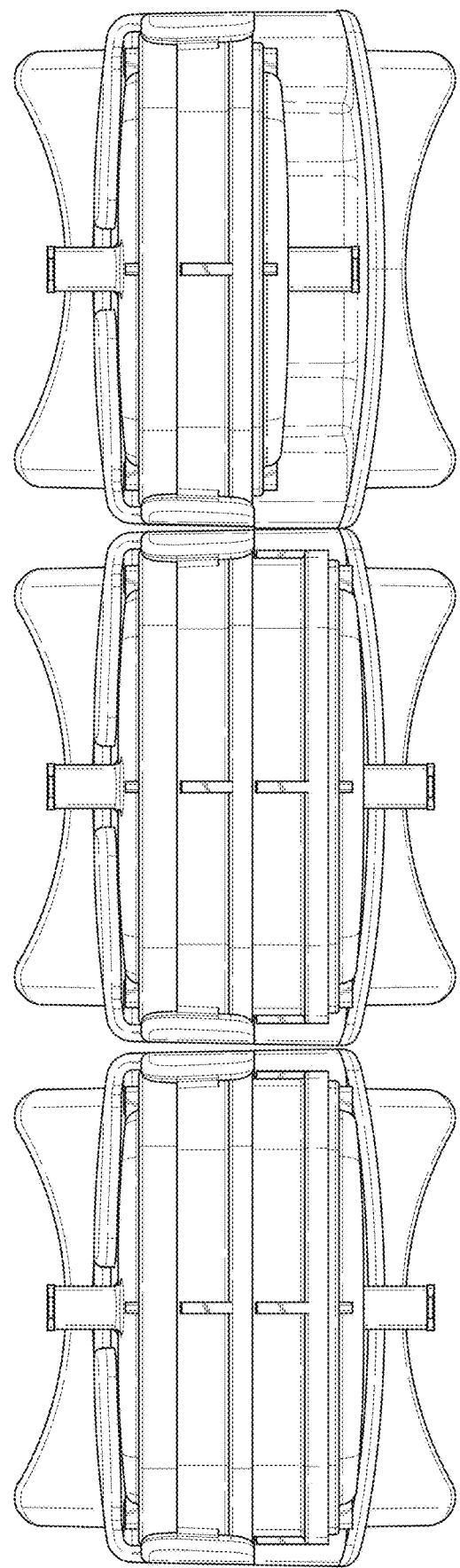
FIG. 8 shows a photograph of three depth filter devices arranged in a horizontal orientation against a metal shelf by means of three magnetic disc filter holders. It is noted that this orientation allows, for example, the depth filter devices to be conveniently located directly over receiver buckets to collect the filtrate during filter sizing tests. Each bucket may be located on a load cell for automated gravimetric measurement of filter throughputs.
Figure 9:
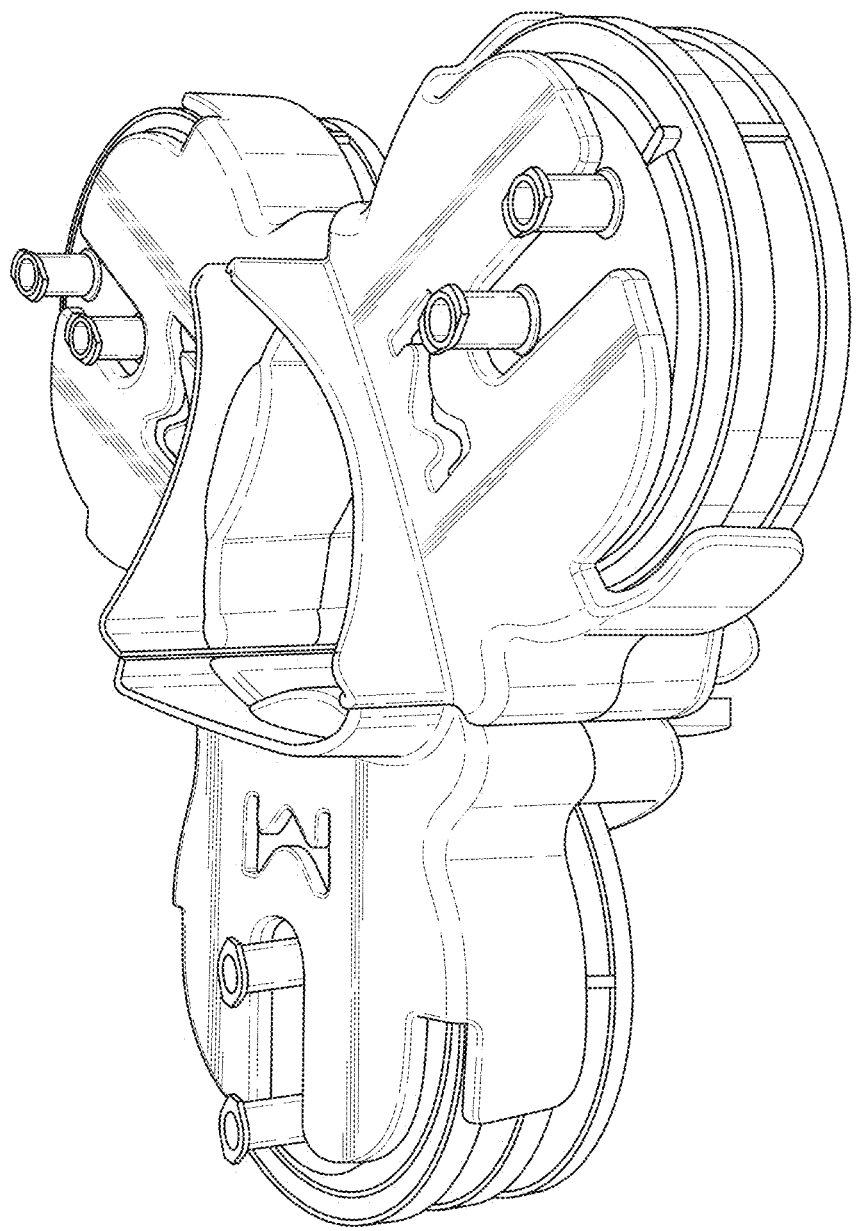
FIG. 9 shows a photograph of three depth filter devices arranged in a circular orientation by means of three magnetic disc filter holders. Note: This orientation allows the depth filter devices to be conveniently assembled to allow for two-stage filtration applications, such as two-stage depth filtration. Two primary depth filters can be coupled to a single secondary depth filter by means of a Luer-Lok™ T-fitting and short lengths of plastic tubing. The circular arrangement of three filters can be placed, for example, in a vertical orientation on a benchtop or in a horizontal orientation above a collection bucket.

FIG. 6 is a view of the disc filter holder of the present invention showing a cut-away of the first side wall, second side wall and base. Shown here, in addition to the elements repeated from the previous figures, are indications of the orientations of the diametrically oriented magnets in the magnet recesses. Orientation is important since the magnets are diametrically magnetized magnets. The orientation of the magnets as indicated will allow for the disc filter holders of the present invention to connect to and orient with other disc filter holders, as is illustrated in FIGS. 7, 8 and 9. It is noted here that the orientation of the magnets need not be as indicated (i.e., south orientation on the left and north orientation on the right) so long as the magnetic orientation is the same in any one set of disc filter holders of the present invention. In an alternative, magnets may be oriented to either cause the filter holders of the present invention to connect with (i.e., magnetically link) or repel each other depending on the desired use, e.g., segregating different sets of filters for various uses where each filter holder in a set of filters would connect but different sets (for different uses or conditions) would repel members of other sets, as illustrated here:

$X\text{-}X\text{-}X < \, > Y\text{-}Y\text{-}Y < \, > Z\text{-}Z\text{-}Z$ where "-" indicates disc filter holders that are magnetically connected or linked and "< >" indicates disc filter holders designed to magnetically repel, respectively depending on the orientation of the magnets, and "X", "Y" and "Z" indicate filters of differing specifications and/or uses.

Unless defined otherwise, all technical and scientific terms used herein have the same meaning as commonly understood by one of ordinary skill in the art to which this invention pertains.

When introducing elements of the present disclosure or the preferred embodiments(s) thereof, the articles "a," "an," "the" and "said" are intended to mean that there are one or more of the elements unless explicitly indicated to the contrary. The terms "comprising," "including" and "having" are intended to be inclusive and mean that there may be additional elements other than the listed elements.

The transitional phrases "comprising," "consisting essentially of" and "consisting of" have the meanings as given in MPEP 2111.03 (Manual of Patent Examining Procedure; United States Patent and Trademark Office). Any claims using the transitional phrase "consisting essentially of" will be understood as reciting only essential elements of the invention and any other elements recited in claims dependent therefrom are understood to be non-essential to the invention recited in the claim from which they depend.

All ranges recited herein include all values within the cited range including all whole, fractional and decimal numbers, inclusive.

We claim:

1. A filter holder, comprising:
   a. a front piece, comprising, i) a front wall having a base, a first side edge and a second side edge, ii) a first front side wall and iii) a second front side wall, said first front side wall connected with the first side edge of the front wall and said second front side wall connected to the second edge of the front wall, both the first front side wall and second front side wall at substantially a right angle to said front wall, wherein said base extends from and is connected to said first front side wall forming a first junction, said second front side wall, forming a second junction, and said front wall and, further, extends beyond said front wall in a direction opposite of said first front side wall and said second front side wall, it's plane substantially perpendicular to the planes of the first side wall, the second side wall and the front wall;
   b. a rear piece, comprising, i) a back wall having a base, ii) a first rear side wall and iii) a second rear side wall, the first rear side wall and the second rear side wall being essentially cylindrical and hollow and extending from said back wall at essentially right angles forming a first cylindrical rear side wall and a second cylindrical rear side wall, wherein said base extends from and is connected to said first rear side wall, said second rear side wall and said back wall and, further, extends beyond said back wall in a direction opposite of said first rear side wall and said second rear side wall;
   c. the front piece further comprising, at the first junction, a first cylindrical opening; and at the second junction, a second cylindrical opening; said first and said second cylindrical openings being aligned with the first cylindrical rear side wall and the second cylindrical opening being aligned with said second cylindrical rear side wall when the front piece is aligned with the rear piece;
   d. a first magnet, sized to fit into said first cylindrical rear side wall and said first front cylindrical opening, and a second magnet size to fit into the second rear side wall and said second cylindrical opening when the front piece is aligned with and connected to the rear piece.

2. The filter holder of claim 1, wherein the front piece has a top edge and a void area, the void area being approximately equidistant between the first side edge and second side edge and extending from the top edge of the front wall to approximately halfway to the base.

3. The filter holder of claim 1, wherein the first front side wall and second front side wall are curved toward each other as they approach the base.

4. The filter holder of claim 1, wherein the width of the front piece is from 1 inch to 12 inches.

5. The filter holder of claim 1, wherein the height of the front piece is from 1 inch to 8 inches.

6. The filter holder of claim 1, further comprising a molded semi-circular trough in the front wall base and in the rear wall base, the trough in the front wall base and rear wall base being substantially aligned, between said first front and said first rear side walls and said second front and said second rear side walls, sized and positioned to hold a disc-shaped filter device.

7. The filter holder of claim 1, wherein said first rear side wall is shorter than said first front side wall and said second rear side wall is shorter than said second front side wall.

8. The filter holder of claim 1, wherein said front wall base extends past the front wall in a direction opposite the back wall and is arched.

9. The filter holder of claim 1, wherein said rear wall base extends past the back wall in a direction opposite the front wall and is arched.

10. The filter holder of claim 1, wherein said first magnet and said second magnet are diametrically magnetized magnets.

11. The filter holder of claim 1, further comprising: wherein, said front piece and said rear piece are connected by glue or heat sealing.

* * * * *